United States Patent
Kuribayashi et al.

(10) Patent No.: US 6,957,636 B2
(45) Date of Patent: Oct. 25, 2005

(54) APPARATUS AND METHOD FOR PREVENTING AN OVERSHOOT IN THE ROTATION SPEED OF AN INTERNAL-COMBUSTION ENGINE

(75) Inventors: Masaru Kuribayashi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/628,376

(22) Filed: Jul. 29, 2003

(65) Prior Publication Data

US 2004/0084907 A1    May 6, 2004

(30) Foreign Application Priority Data

Nov. 5, 2002 (JP) .............................. 2002-321478

(51) Int. Cl.[7] .............................................. F02N 11/04
(52) U.S. Cl. ............................. 123/179.3; 123/179.28; 290/31
(58) Field of Search ................... 123/179.3, 179.4, 123/179.28; 290/22–26, 31, 34, 35

(56) References Cited

U.S. PATENT DOCUMENTS 5,495,127 A * 2/1996 Aota et al. .................... 290/31
6,291,902 B1   9/2001 Ogane et al. ................. 290/34

FOREIGN PATENT DOCUMENTS

JP    2000-297668       10/2000
JP    2002-191192 A     7/2002

* cited by examiner

*Primary Examiner*—Andrew M. Dolinar
(74) *Attorney, Agent, or Firm*—Sughrue Mion, PLLC

(57) ABSTRACT

A starter/battery charger, which is coupled to an internal-combustion engine, operates as a starting motor for starting the engine and also operates as a charging generator for charging a battery after the engine has been started. Control unit controls the rotation speed of the engine by performing a driving control and a braking control on the starter/battery charger. The control unit carries out a judgement that a self-ignition state has been established in the engine depends on one of the rotation speed of the engine and a variation rate of the rotation speed has exceeded a prescribed value. The control unit switchs from the driving control to the braking control upon the judgement, thereby preventing the overshoot in the rotation speed of the engine.

12 Claims, 4 Drawing Sheets

APPARATUS AND METHOD FOR PREVENTING AN OVERSHOOT IN THE ROTATION SPEED OF AN INTERNAL-COMBUSTION ENGINE

BACKGROUND OF THE INVENTION

1. Field of the Invention

The present invention relates to an apparatus and method for preventing an overshoot in the rotation speed of an internal-combustion engine.

2. Description of the Related Art

It is well known that an internal-combustion engine is started by rotating the crank shaft of the engine by means of a starter that is coupled to the engine. In general, the rotation speed of an internal-combustion engine is increased to 200 to 300 rpm at the time of a start and is thereafter increased further to a self-ignition rotation speed of the engine, that is, an idling rotation speed or a rotation speed of a control by a controller for the engine.

In starting an internal-combustion engine, to improve the ignition performance in a range lower than an idling rotation speed, the controller for the engine performs a control of promoting a self-ignition-based operation by controlling the ignition timing and increasing a fuel supply rate (e.g., refer to JP-A-2002-191192 (paragraph 0002)).

In conventional internal-combustion engines that are started in the above-described manner, the following phenomenon occurs at a start that is associated with an increase in fuel supply rate. At an instant when self-ignition of the engine has just started, because of mechanical delays in the air system and the fuel system of the engine and delays in the control system that detects a rotation speed of the engine and issues instructions relating to an air supply rate, a fuel injection amount, and ignition timing in accordance with the detected rotation speed, torque is generated that is higher than necessitated to attain an idling rotation speed or a target rotation speed of an instruction from the controller of the engine, resulting in an overshoot in rotation speed.

Such an overshoot in the rotation speed of the engine causes a steep rise in rotation speed particularly when the engine is restarted in an idling-stop state. As a result, the pressure of oil as a medium of a coupling portion between the transmission and the engine increases sharply to possibly cause an abrupt start of the vehicle or give a shock to it. This is problematic in terms of the safety and comfort of a drive.

To solve this problem, the above-mentioned patent document, for example, proposes a control method in which a deviation of an actual rotation speed of an internal-combustion engine from a target one is calculated and the torque of a starter/battery charger is switched to the positive or negative side in accordance with the calculated deviation. However, although an attempt to prevent an overshoot in the engine should be performed instantaneously, in the method of this document the overshoot-preventive control takes considerable time, that is, cannot be performed instantaneously. Further, this method makes it necessary to recognize a torque generation characteristic of the engine that depends on its state and a toque characteristic involving the engine and the starter/battery charger. As such, this method has an aspect that complicated calibration is necessary.

SUMMARY OF THE INVENTION

The present invention has been made to solve the above problems, and an object of the invention is therefore to provide an apparatus and method for preventing an overshoot in the rotation speed of an internal-combustion engine in a simple manner.

A first aspect of the invention provides an apparatus for preventing an overshoot in a rotation speed of an internal-combustion engine, includes a starter/battery charger and a controller. The starter/battery charger is coupled to a crank shaft of the internal-combustion engine, operates as a starter for starting the internal-combustion engine, and also operates as a battery charger for charging a battery after the internal-combustion engine has been started. The controller performs a driving control and a braking control on the starter/battery charger and thereby controlling the rotation speed of the internal-combustion engine. The controller is constructed so as to monitor the rotation speed of the internal-combustion engine, to carry out a judgement that a self-ignition state has been established in the internal-combustion engine depends on one of the rotation speed of the internal-combustion engine and a variation rate of the rotation speed has exceeded a prescribed value during an engine starting operation, and to switch from the driving control to the braking control upon the judgement that the self-ignition state has been established in the internal-combustion engine.

In this overshoot preventing apparatus, the controller monitors the rotation speed of the internal-combustion engine and carries out a judgement that a self-ignition state has been established in the internal-combustion engine depends on one of the rotation speed of the internal-combustion engine and the variation rate of the rotation speed has exceeded a prescribed value during an engine starting operation. The controller carries out the judgement whether the self-ignition state has been established in the internal-combustion engine by making a simple judgment as to whether one of the rotation speed of the engine and the variation rate of the rotation speed has exceeded the prescribed value by utilizing the fact that the rotation speed increases rapidly after the self-ignition state is established in the internal-combustion engine. Upon the judgement in a simple manner that the self-ignition state has been established, the controller switches from the driving control to the braking control. In this manner, an overshoot in the rotation speed of the internal-combustion engine can be prevented effectively.

A second aspect of the invention provides an apparatus for preventing an overshoot in a rotation speed of an internal-combustion engine, includes a starter/battery charger and a controller. The starter/battery charger includes 3-phase armature coils, is connected to a crank shaft of the internal-combustion engine, operates as a starting motor for starting the internal-combustion engine, and also operates as a charging generator for charging a battery after the internal-combustion engine has been started. The controller performs a driving control for causing the starter/battery charger to generate positive torque and a braking control for causing the starter/battery charger to generate negative torque and thereby controlling the rotation speed of the internal-combustion engine. The controller causes the starter/battery charger to generate negative torque in the braking control by effecting short-circuiting between phases of the 3-phase armature coils of the starter/battery charger, to thereby prevent an overshoot in the rotation speed of the internal-combustion engine.

In this overshoot preventing apparatus, the controller causes the starter/battery charger to generate negative torque in the braking control by effecting short-circuiting between the phases of the 3-phase armature coils of the starter/battery charger. The short-circuiting between the phases of the 3-phase armature coils of the starter/battery charger allows, easily and effectively, the starter/battery charger to generate negative torque, and thereby makes it possible to prevent the overshoot in the rotation speed of the internal-combustion engine.

A third aspect of the invention provides a method for preventing an overshoot in a rotation speed of an internal-combustion engine, the method using a starter/battery charger and a controller. The starter/battery charger is coupled to a crank shaft of the internal-combustion engine, operates as a starter for starting the internal-combustion engine, and also operates as a battery charger for charging a battery after the internal-combustion engine has been started. The method includes the steps of carrying out a judgement that a self-ignition state has been established in the internal-combustion engine depends on one of the rotation speed of the internal-combustion engine and a variation rate of the rotation speed has exceeded a prescribed value during an engine starting operation; and switching a control on the starter/battery charger from a driving control to a braking control upon the judgement that the self-ignition state has been established in the internal-combustion engine, to thereby prevent the overshoot in the rotation speed of the internal-combustion engine.

In this overshoot preventing method, it is carried out the judgement that the self-ignition state has been established in the internal-combustion engine depends on one of the rotation speed of the internal-combustion engine and the variation rate of the rotation speed has exceeded a prescribed value during an engine starting operation. Whether the self-ignition state has been established in the internal-combustion engine is carried out the judgement by making a simple judgment as to whether one of the rotation speed of the internal-combustion engine and the variation rate of the rotation speed has exceeded the prescribed value by utilizing the fact that the rotation speed increases rapidly after the self-ignition state is established in the internal-combustion engine. As soon as the judgement result that the self-ignition state has been established is obtained in a simple manner, switching is made from the driving control to the braking control. In this manner, the overshoot in the rotation speed of the internal-combustion engine can be prevented effectively.

A fourth aspect of the invention provides a method for preventing an overshoot in a rotation speed of an internal-combustion engine, the method using a starter/battery charger and a controller. The starter/battery charger includes 3-phase armature coils, is coupled to a crank shaft of the internal-combustion engine, operates as a starting motor for starting the internal-combustion engine, and also operates as a charging generator for charging a battery after the internal-combustion engine has been started. The controller performs a driving control for causing the starter/battery charger to generate positive torque and a braking control for causing the starter/battery charger to generate negative torque and thereby controlling the rotation speed of the internal-combustion engine. The starter/battery charger is caused to generate negative torque in the braking control by effecting short-circuiting between the phases of the 3-phase armature coils of the starter/battery charger, whereby the overshoot in the rotation speed of the internal-combustion engine is prevented.

In this overshoot preventing method, the starter/battery charger is caused to generate negative torque in the braking control by effecting short-circuiting between the phases of the 3-phase armature coils of the starter/battery charger. The short-circuiting between the phases of the 3-phase armature coils of the starter/battery charger allows, easily and effectively, the starter/battery charger to generate negative torque, and thereby makes it possible to prevent the overshoot in the rotation speed of the internal-combustion engine.

DESCRIPTION OF THE PREFERRED EMBODIMENTS

First Embodiment

Figure 1:
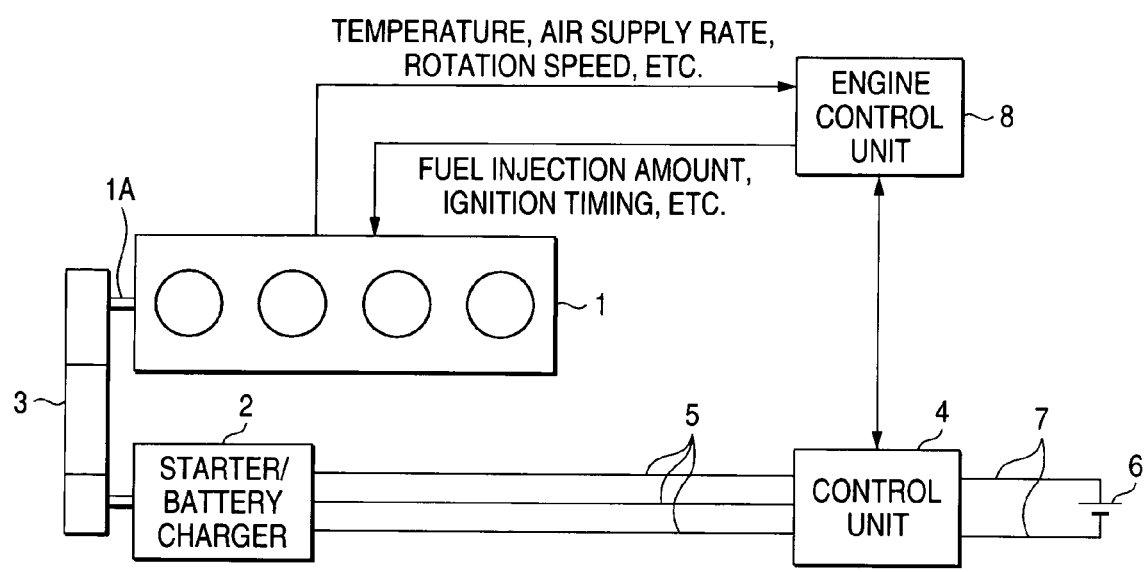
FIG. 1 is a schematic diagram showing a configuration of a first embodiment of the present invention.

A first embodiment of the present invention will be described below with reference to FIG. 1. FIG. 1 is a schematic diagram showing a configuration and a method of the first embodiment. As shown in FIG. 1, a starter/battery charger 2 of an internal-combustion engine 1 is a 3-phase synchronous rotary machine, for example, which is coupled to a crank shaft 1A of the engine 1 via a belt 3. Alternatively, the starter/battery charger 2 may be coupled to the crank shaft 1A directly, that is, without intervention of the belt 3.

A control unit 4 for the starter/battery charger 2 is connected to the starter/battery charger 2 via 3-phase lines 5 that are connected to 3-phase armature coils, and controls the starter/battery charger 2 so that it can generate start drive torque (positive torque) or braking torque (negative torque).

A battery 6 that is connected to the control unit 4 via power lines 7 serves as a power source for the control unit 4. When the starter/battery charger 2 operates as a starting motor for the engine 1, the battery 6 supplies power to the starter/battery charger 2 via the control unit 4 and the armature 3-phase lines 5. After self-operation with self-ignition has been established in the engine 1, the battery 6 is charged by the starter/battery charger 2 serving as a charging generator.

An engine control unit 8 has a function of receiving information relating to a rotation speed, information relating to intake air, information relating to temperature, etc. from the engine 1 and outputs corresponding control instructions such as an intake air rate, a fuel injection amount, and ignition timing to the engine 1. The engine control unit 8 also has a function of allowing itself to supply, as a higher-rank control unit for the control unit 4, an instruction signal and such information as a rotation speed of the engine 1 to the control unit 4. The control unit 4 and the engine control unit 8 construct a controller in this invention.

Figure 2:
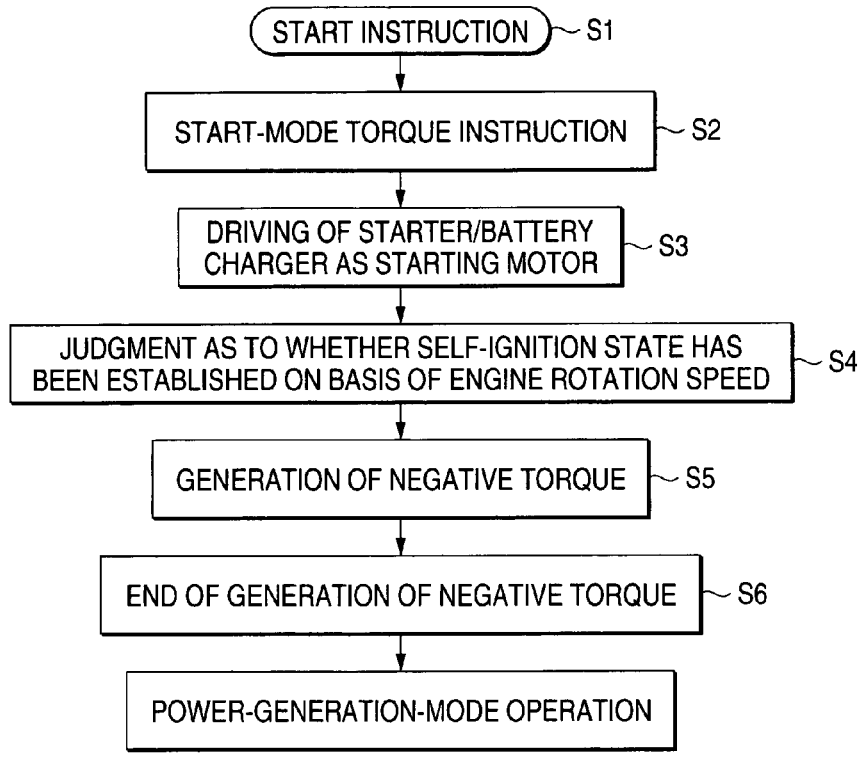
FIG. 2 is a flowchart showing a control on a starter/battery charger according to the first embodiment.

FIG. 2 is a flowchart showing a control on the starter/battery charger 2 according to the first embodiment. At step S1, the control unit 8 supplies a start instruction to the control unit 4. At step S2, the control unit 8 supplies the control unit 4 with a torque instruction to cause the starter/ battery charger 2 to operate as a starting motor. At step S3, the control unit 4 drives the starter/battery charger 2 by supplying it with power from the battery 6 on the basis on the torque instruction.

At this time, a vector control, for example, is employed as a torque control on the starter/battery charger 2, where a current corresponding to a torque vector component is determined. At step S4, the control unit 8 monitors an engine rotation speed signal being input thereto. Since the rotation speed increases sharply when a self-ignition state has been established in the engine 1, whether the self-ignition state has been established can be carried out the judgement by monitoring the rotation speed signal. For example, a sharp increase in rotation speed can be detected by judging whether the variation rate of the rotation speed of the engine 1 has exceeded a prescribed value. Or that a self-ignition state has been established may be judged when the rotation speed has exceeded a prescribed value.

At step S5, to prevent an overshoot in the rotation speed of the engine 1 when the self-ignition state has been established in the engine 1, the control unit 4 causes the starter/battery charger 2 to generate negative torque by controlling the power of its armature coils. The negative torque itself and a time during which to generate the negative torque can simply be controlled by an open-loop control by using values that were set in advance by calibration.

At step S6, the control unit 4 sends back a negative torque generation end signal to a higher-rank control unit or the engine control unit 8 and causes the starter/battery charger 2 to operate in a power generation mode.

Second Embodiment

Figure 3:
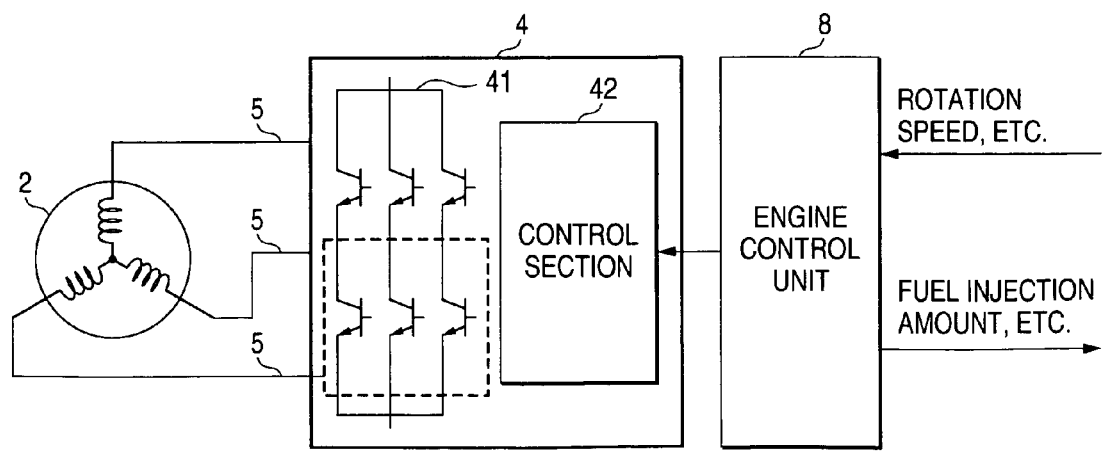
FIG. 3 is a schematic diagram showing a starter/battery charger and its control unit according to a second embodiment of the invention.

Next, a second embodiment of the invention will be described with reference to FIG. 3. FIG. 3 is a schematic diagram showing a starter/battery charger and its control unit according to the second embodiment. Components in FIG. 3 having the same or corresponding components in FIG. 1 are given the same reference numerals and will not be described.

The control unit 4 for the starter/battery charger 2 includes an inverter section 41 consisting of arms of three respective phases in each of which a pair of switching elements are connected to each other in series. The control unit 4 also includes a control section 42 of the inverter section 41. The control unit 4 controls the supply of power to the starter/battery charger 2 on the basis of an instruction from the higher-rank control unit or the engine control unit 8. On the other hand, monitoring the rotation speed of the engine 1, the higher-rank control unit or the engine control unit 8 judges, in the above-described manner, on the basis of an engine rotation speed signal, whether the self-ignition state has been established in the engine 1.

In a process of starting the engine 1, to attain torque that is necessary for acceleration from a rotation speed of cranking by the starter/battery charger 2 to a self-ignition rotation speed, that is, an idling rotation speed or a target rotation speed of a control by the engine control unit 8, the fuel injection amount is set larger than necessitated to maintain an ordinary idling rotation speed. This is a factor of causing an overshoot in the rotation speed of the engine 1. In view of this, when receiving an engine self-ignition completion signal from the higher-rank control unit or the engine control unit 8, the control unit 4 for the starter/battery charger 2 short-circuits the bottom switching elements (indicated by a broken line in FIG. 3) of the respective arms of the inverter section 41 to thereby establish a 3-phase short-circuited state in the 3-phase armature coils of the starter/battery charger 2.

As a result, short-circuiting currents flow through the starter/battery charger 2, whereby negative torque is generated rapidly. The negative torque prevents the overshoot in the rotation speed of the engine 1 and can thereby reduce a shock that is given to the vehicle.

Third Embodiment

Figure 4:
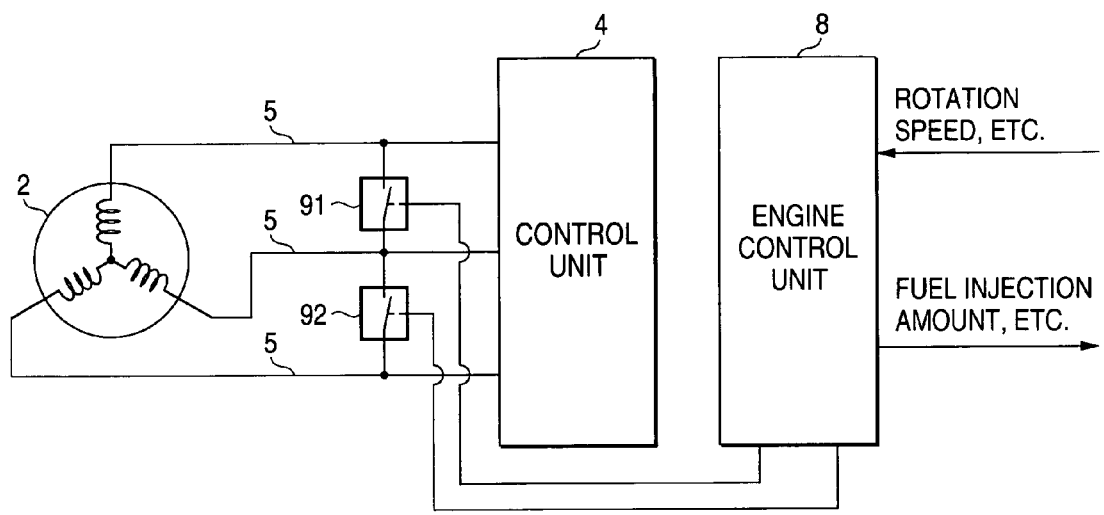
FIG. 4 is a schematic diagram showing a starter/battery charger and its control unit according to a third embodiment of the invention.

Next, a third embodiment of the invention will be described with reference to FIG. 4. FIG. 4 is a schematic diagram showing a starter/battery charger and its control unit according to the third embodiment. Components in FIG. 4 having the same or corresponding components in FIG. 3 are given the same reference numerals and will not be described. This embodiment is different from the second embodiment of FIG. 3 in the following points. Switches 91 and 92 are provided between the armature 3-phase lines 5 for the 3-phase armature coils of the starter/battery charger 2. The switches 91 and 92 are closed in response to the engine self-ignition completion signal from the higher-rank control unit or the engine control unit 8 and a 3-phase short-circuited state is established for a prescribed time, during which the starter/battery charger 2 generates negative torque. This makes it possible to properly prevent the overshoot in the rotation speed of the engine 1.

In this embodiment, a 3-phase short-circuited state is established by the switches 91 and 92. Therefore, heat-resisting measures in the inverter section 41 of the control unit 4 can be minimized and hence the size and the cost of the control unit 4 can be reduced.

Fourth Embodiment

Figure 5:
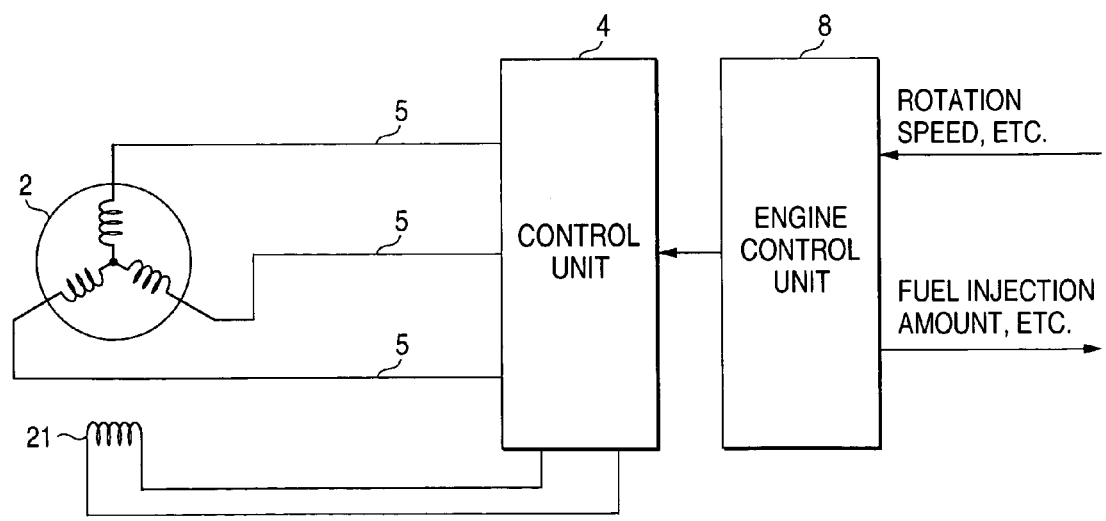
FIG. 5 is a schematic diagram showing a starter/battery charger and its control unit according to a fourth embodiment of the invention.

Next, a fourth embodiment of the invention will be described with reference to FIGS. 5 and 6A–6C. FIG. 5 is a schematic diagram showing a starter/battery charger and its control unit according to the fourth embodiment. Components in FIG. 5 having the same or corresponding components in FIG. 3 are given the same reference numerals and will not be described. This embodiment is different from the second embodiment of FIG. 3 in that a rapid torque variation of the starter/battery charger 2 is prevented by controlling the armature currents of the starter/battery charger 2 and the field current of a field coil 21 with the control unit 4.

When receiving the engine self-ignition completion signal from the engine control unit 8, the control unit 4 short-circuits the armature 3-phase lines 5 and, at the same time, controls the current flowing through the field coil 21.

Figure 6A:
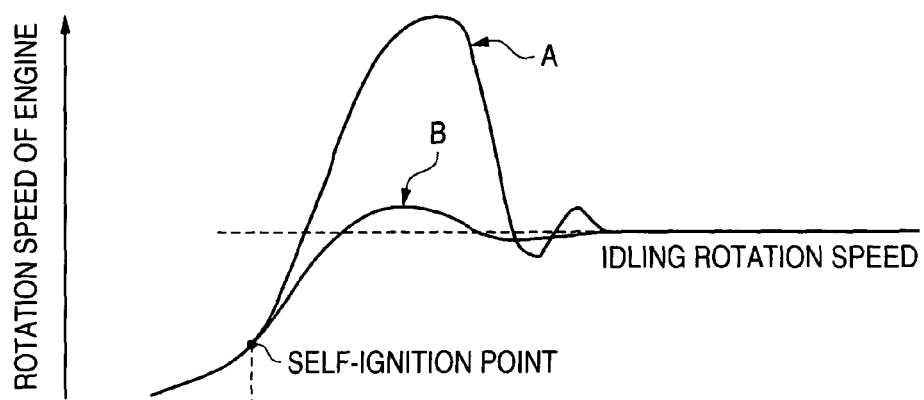
FIGS. 6A–6C illustrate the operation of the fourth embodiment.
Figure 6B:
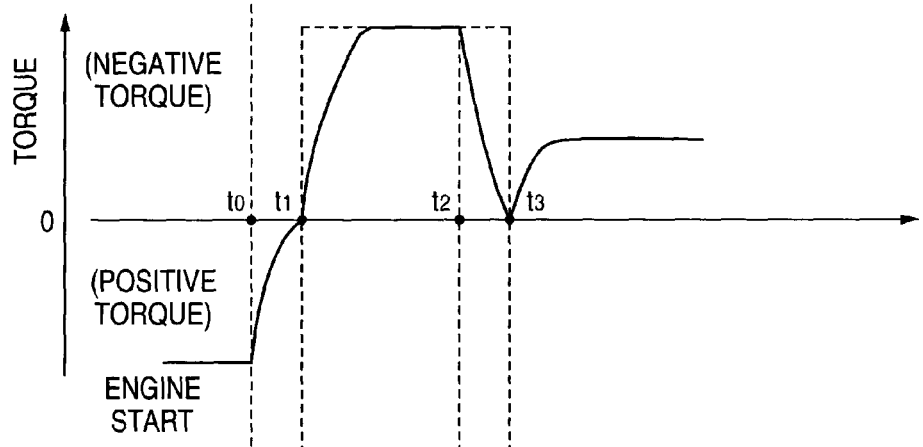
Figure 6C:
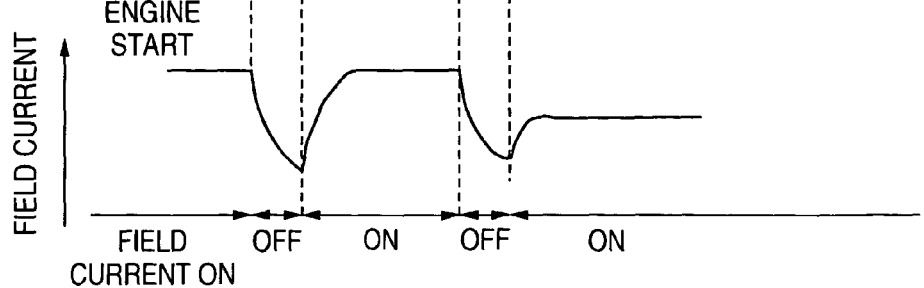

FIGS. 6A–6C illustrate the operation of the fourth embodiment. FIG. 6A shows a variation in the rotation speed of the engine 1. FIG. 6B illustrates torque that is generated by the starter/battery charger 2. FIG. 6C illustrates a field current flowing through the field coil 21. Exhibiting a larger inductance than the armature coils, the field coil 21 of the starter/battery charger 2 has a larger time constant than the armature coils. Therefore, when the self-ignition state has been established in the engine 1, a signal to that effect has been sent from the engine control unit 8 to the control unit 4, and the control unit 4 has short-circuited the armature 3-phase lines 5 and made a control for shutting off the current flowing though the field coil 21 (time $t_0$; see FIGS. 6A and 6B), the current flowing though the field coil 21 decreases as shown in FIG. 6C and the torque of the starter/battery charger 2 falls (starts to fall at time $t_0$) more slowly than in a case that only short-circuiting of the 3-phase armature coils is effected and reaches 0 after a lapse of a certain time, that is, at time $t_1$, as shown in FIG. 6B. When the field coil 21 is energized at time $t_1$, the field current increases with a large time constant as shown in FIG. 6C. As the field current increases, the torque of the starter/battery charger 2 increases (starts to increase at time $t_1$) slowly in the negative direction.

As described above, since negative torque of the starter/battery charger 2 rises slowly, a shock due to a rapid torque variation can be prevented and the rotation speed of the engine 1 varies slowly without any overshoot as indicated by character B in FIG. 6A.

In FIG. 6A, character A indicates a variation in the rotation speed of a conventional engine in which no torque absorption using negative torque is effected.

When a control for shutting off the current flowing through the field coil 21 is made at time $t_2$, the field current decreases slowly as shown in FIG. 6C and the torque (negative torque) of the starter/battery charger 2 generated with the short-circuiting of the 3-phase armature coils also decreases slowly as shown in FIG. 6B.

Then, the short-circuiting of the 3-phase armature coils and the shutoff state of the field current are canceled at time $t_3$, whereupon self-operation of the engine 1 is established and the starter/battery charger 2 starts to operate as a charging generator.

In this embodiment having the above-described features, the armature coils of the starter/battery charger 2 are short-circuited and the current flowing through the field coil 21 are decreased and increased slowly. As a result, a rapid torque variation is prevented when the 3-phase armature coils are short-circuited or its short-circuiting is canceled and hence an overshoot in rotation speed can be prevented effectively.

What is claimed is:

1. An apparatus for preventing an overshoot in a rotation speed of an internal-combustion engine, comprising:
    a starter/battery charger that includes 3-phase armature coils, is coupled to a crank shaft of the internal-combustion engine, operates as a starting motor for starting the internal-combustion engine, and also operates as a charging generator for charging a battery after the internal-combustion engine has been started; and
    a controller for performing a driving control for causing the starter/battery charger to generate positive torque and a braking control for causing the starter/battery charger to generate negative torque and thereby controlling the rotation speed of the internal-combustion engine,
    wherein the controller causes the starter/battery charger to generate negative torque in the braking control by effecting a 3-phase short-circuiting between phases of the 3-phase armature coils of the starter/battery charger, to thereby prevent the overshoot in the rotation speed of the internal-combustion engine.

2. The apparatus according to claim 1, further comprising switches that are provided between 3-phase lines of the 3-phase armature coils of the starter/battery charger, for effecting the 3-phase short-circuiting between the phases of the 3-phase armature coils.

3. The apparatus according to claim 1 or 2, wherein the starter/battery charger further includes a field coil, and wherein the controller controls not only currents flowing through the 3-phase armature coils but also a current flowing through the field coil, to thereby prevent a rapid torque variation in the starter/battery charger.

4. A method for preventing an overshoot in a rotation speed of an internal-combustion engine, the method using a starter/battery charger that includes 3-phase armature coils, is coupled to a crank shaft of the internal-combustion engine, operates as a starting motor for starting the internal-combustion engine, and also operates as a charging genera-tor for charging a battery after the internal-combustion engine has been started; and a controller for performing a driving control for causing the starter/battery charger to generate positive torque and a braking control for causing the starter/battery charger to generate negative torque and thereby controlling the rotation speed of the engine, wherein:
    the starter/battery charger is caused to generate negative torque in the braking control by effecting a 3-phase short-circuiting between phases of the 3-phase armature coils of the starter/battery charger, to thereby prevent the overshoot in the rotation speed of the internal-combustion engine.

5. The method according to claim 4, wherein the 3-phase short-circuiting between the phases of the 3-phase armature coils of the starter/battery charger is effected by using switches that are provided between 3-phase lines of the 3-phase armature coils.

6. The method according to claim 4 or 5, wherein the starter/battery charger is a rotary electric machine including a field coil in addition to the 3-phase armature coils, and wherein not only currents flowing through the 3-phase armature coils but also a current flowing through the field coil is controlled, to thereby prevent a rapid torque variation in the starter/battery charger.

7. An apparatus for preventing an overshoot in a rotation speed of an internal-combustion engine before reaching an idling rotation speed thereof, comprising:
    a starter/battery charger that includes 3-phase armature coils, is coupled to a crank shaft of the internal-combustion engine, operates as a starting motor for starting the internal-combustion engine, and also operates as a charging generator for charging a battery after the internal-combustion engine has been started; and
    a controller for carrying out a judgment that a self-ignition state has been established in the internal-combustion engine prior to the rotation speed reaching the idling rotation speed, switching from a driving control for causing the starter/battery charger to generate positive torque to a braking control for causing the starter/battery charger to generate negative torque upon the judgment, and thereby controlling the rotation speed of the internal-combustion engine,
    wherein the controller causes the starter/battery charger to generate negative torque in the braking control by effecting a 3-phase short-circuiting between phases of the 3-phase armature coils of the starter/battery charger, to thereby prevent the overshoot in the rotation speed of the internal-combustion engine.

8. The apparatus according to claim 7, further comprising switches that are provided between 3-phase lines of the 3-phase armature coils of the starter/battery charger, for effecting the 3-phase short-circuiting between the phases of the 3-phase armature coils.

9. The apparatus according to claim 7 or 8, wherein the starter/battery charger further includes a field coil, and wherein the controller controls not only currents flowing through the 3-phase armature coils but also a current flowing through the field coil, to thereby prevent a rapid torque variation in the starter/battery charger.

10. A method for preventing an overshoot in a rotation speed of an internal-combustion engine before reaching an idling rotation speed thereof, the method using a starter/battery charger that includes 3-phase armature coils, is coupled to a crank shaft of the internal-combustion engine, operates as a starter for starting the internal-combustion engine, and also operates as a charging generator for charging a battery after the internal-combustion engine has been started; and a controller for carrying out a judgment that a self-ignition has been established in the internal-combustion engine prior to the rotation speed reaching an idling rotation speed, switching from a driving control for causing the starter/battery charger to generate a positive torque to a braking control for causing the starter/battery charger to generate a negative torque and thereby controlling the rotation speed of the internal-combustion engine, wherein the starter/battery charger is caused to generate the negative torque in the braking control by effecting a 3-phase short-circuiting between phases of the 3-phase armature coils of the starter/battery charger, to thereby prevent the overshoot in the rotation speed of the internal-combustion engine.

11. The method according to claim 10, wherein the 3-phase short-circuiting between the phases of the 3-phase armature coils of the starter/battery charger is effected by using switches that are provided between 3-phase lines of the 3-phase armature coils.

12. The method according to claim 10 or 11, wherein the starter/battery charger is a rotary electric machine including a field coil in addition to the 3-phase armature coils, and wherein not only currents flowing through the 3-phase armature coils but also a current flowing through the field coil is controlled, to thereby prevent a rapid torque variation in the starter/battery charger.

\* \* \* \* \*